United States Patent
Frankel et al.

(10) Patent No.: US 10,462,111 B2
(45) Date of Patent: Oct. 29, 2019

(54) COMMUNICATION NETWORK WITH ROLLING ENCRYPTION KEYS AND DATA EXFILTRATION CONTROL

(71) Applicant: BANK OF AMERICA CORPORATION, Charlotte, NC (US)

(72) Inventors: Yair Frankel, Westfield, NJ (US); Abdul Rafman Azeez, Watchung, NJ (US)

(73) Assignee: Bank of America Corporation, Charlotte, NC (US)

( * ) Notice: Subject to any disclaimer, the term of this patent is extended or adjusted under 35 U.S.C. 154(b) by 222 days.

(21) Appl. No.: 15/599,278

(22) Filed: May 18, 2017

(65) Prior Publication Data

US 2018/0337896 A1 Nov. 22, 2018

(51) Int. Cl.
*H04L 29/06* (2006.01)
*H04L 9/32* (2006.01)
*H04L 9/08* (2006.01)

(52) U.S. Cl.
CPC .......... *H04L 63/0428* (2013.01); *H04L 9/088* (2013.01); *H04L 9/3228* (2013.01); *H04L 9/3297* (2013.01)

(58) Field of Classification Search
CPC . H04L 63/0428; H04L 9/0819; H04L 9/3297; H04L 9/088; H04L 9/3228
See application file for complete search history.

(56) References Cited

U.S. PATENT DOCUMENTS

| | | | |
|---|---|---|---|
| 8,713,633 B2 | 4/2014 | Thomas | |
| 8,856,960 B2 | 10/2014 | Puttaswamy Naga et al. | |
| 9,037,861 B2 | 5/2015 | Arya et al. | |
| 9,213,850 B2 | 12/2015 | Barton et al. | |
| 9,246,927 B2 | 1/2016 | Nelson et al. | |
| 9,262,643 B2 | 2/2016 | Cidon et al. | |
| 9,306,960 B1 | 4/2016 | Aziz | |
| 9,392,015 B2 | 7/2016 | Thomas | |
| 9,411,708 B2 | 8/2016 | Bhattacharya et al. | |
| 9,430,534 B2 | 8/2016 | Bhattacharya et al. | |
| 9,430,646 B1 | 8/2016 | Mushtaq et al. | |
| 9,497,192 B2 | 11/2016 | Nelson et al. | |
| 9,722,974 B1 * | 8/2017 | Fuller | H04L 63/0428 |
| 2013/0159699 A1 * | 6/2013 | Torkkel | G06F 21/6245 713/155 |

(Continued)

*Primary Examiner* — Ayoub Alata
(74) *Attorney, Agent, or Firm* — Michael A. Springs

(57) ABSTRACT

An apparatus that includes a memory configured to store encryption keys and encrypted data entries. The apparatus further includes an encryption service engine configured to periodically re-encrypt the encrypted data element, which includes determining that an encryption wait time period has lapsed, obtaining a first encryption key using a first key index, and decrypting the encrypted data element using the first encryption key to recover the original data. The encryption service engine is further configured to obtain a second encryption key, encrypt the original data using the second encryption key, and modify the metadata linked with the encrypted data element with a second key index referencing the second encryption key. The encryption service engine is further configured to receive a data request for the encrypted data element, to send the encrypted data element, and to limit the bandwidth of a data channel used to send the encrypted data element.

17 Claims, 5 Drawing Sheets

(56) References Cited

U.S. PATENT DOCUMENTS

| | | | |
|---|---|---|---|
| 2016/0014111 A1* | 1/2016 | Kurz | G06F 21/44 |
| | | | 713/172 |
| 2016/0162522 A1 | 6/2016 | Ganatra | |
| 2016/0182225 A1* | 6/2016 | Marinet | G06F 21/62 |
| | | | 713/193 |
| 2016/0321460 A1 | 11/2016 | Suter et al. | |
| 2016/0371508 A1* | 12/2016 | McCorkendale | G06F 21/6254 |
| 2018/0191770 A1* | 7/2018 | Nachenberg | H04L 63/1425 |

* cited by examiner

COMMUNICATION NETWORK WITH ROLLING ENCRYPTION KEYS AND DATA EXFILTRATION CONTROL

TECHNICAL FIELD

The present disclosure relates generally to cryptography, and more specifically to a communication system using cryptography.

BACKGROUND

Computers and other network devices are increasingly interconnected over private and public networks (e.g. cloud networks), which exposes them to an increased risk of attack. A data breach or data exfiltration is one type of attack that occurs when data is taken from within a computer network by an unauthorized or bad actor. Bad actors employ various techniques to steal sensitive information from a computer network.

Conventional systems may encrypt stored data in an effort to make it harder for a bad actor to read exfiltrated data. Encrypting the stored data provides some level of protection, however bad actors are still able to obtain large amounts of data. Bad actors may also obtain an encryption key for the data using data exfiltration. Once data leaves the network, the network is unable to protect the data. This means that once data has been exfiltrated, bad actors can use more time intensive processes (e.g. brute force) to decrypt the data. It is desirable to provide a technical solution that enables a network to protect its data and to mitigate damage caused by events like data breaches.

SUMMARY

Protecting data within a computer network from events like data breaches and data exfiltration poses several technical challenges. For example, conventional systems encrypt stored data in an effort to make it harder for a bad actor to read exfiltrated data, however bad actors are still able to obtain large amounts of data. Bad actors may also obtain an encryption key for the data using data exfiltration. Another technical challenge is that once data leaves the network, the network is unable to protect the data. This means that once data has been exfiltrated, bad actors can use more time intensive processes (e.g. brute force) to decrypt the data. Thus, it is challenging for conventional systems to mitigate the damage caused by data exfiltration.

An encryption service device provides a technical solution to these challenges by combining periodic data re-encryption with data exportation control that limits the amount of data that can be exfiltrated. In one embodiment, an encryption service device encrypts stored data and periodically re-encrypts the data using rolling encryption keys. The rolling encryption keys are encryption keys that are constantly being changed. Unlike conventional systems that derive new encryption keys based on a master encryption key, this solution uses a new master encryption key each time data is re-encrypted.

By periodically re-encrypting the stored data with different encryption keys, the encryption service device provides enhanced data security. For example, in the event that a bad actor is able to obtain data and an encryption key, the encryption key is only valid for decrypting data for a period of time before the data is re-encrypted using a different encryption key. The encryption key obtained by the bad actor is no longer valid once the data has been re-encrypted, and thus, the bad actor is no longer able to decrypt the data.

The encryption service device is configured to limit the amount of data that leaves a memory within a period of time. In one embodiment, the encryption service device limits the bandwidth of encrypted data that leaves the encrypted service device. The encryption service device controls how much data can be exfiltrated by limiting the bandwidth of the data channel (e.g. port) used to provide data. By limiting the bandwidth of the data channel, the encryption service device prevents a bad actor from being able to access or download large quantities of data. The encryption service device limits the bandwidth such that only a small portion of the encrypted data can be accessed or downloaded within a period of time. Additionally or alternatively, the encryption service device limits how much data can be exfiltrated by limiting the amount, for example, in terms of bytes, of data that can be downloaded by a device and/or within a period of time. For example, the encryption service device may be configured to only allow a device to download 100 megabytes of data per hour. As another example, the encryption service device may be configured to only allow a device to download up to 10% of the total data stored in a memory within a 24 hour period. The encryption service device limits the volume of data that is downloaded by other devices such that only a small portion of the encrypted data can be accessed or downloaded within a period of time.

The encryption service device provides an unconventional solution that combines periodic data re-encryption with data exportation control to limit the amount of data that can be exfiltrated and accessed. The combination of periodically re-encrypting the stored data and limiting the amount of data that can be exfiltrated means that a bad actor has access to only a small amount of data that is encrypted using an encryption key that constantly changes. This combination provides a technical advantage over conventional systems by both limiting the amount of data a bad actor has access to as well as limiting the ability to access the contents of the encrypted data.

In one embodiment, the disclosure includes an apparatus that includes a memory configured to store a plurality of encryption keys and an encrypted data entry. Each encryption key is linked with an encryption key index. The encrypted data comprises an encrypted data element and metadata linked with the encrypted data element. The metadata identifies a first encryption key index referencing a first encryption key from the plurality of encryption keys and an encryption wait time period. The apparatus further includes an encryption service engine configured to periodically re-encrypt the encrypted data element. Re-encrypting the encrypted data element includes determining that the encryption wait time period has lapsed, obtaining the first encryption key from the plurality of encryption keys using the first encryption key index, and decrypting the encrypted data element using the first encryption key to recover the original data element. The process further includes obtaining a second encryption key, encrypting the original data element using the second encryption key, and modifying the metadata linked with the encrypted data element with a second encryption key index referencing the second encryption key. encryption service engine is further configured to receive a data request for the encrypted data element, send the encrypted data element in response to receiving the data request, and limit the bandwidth of a data channel used to send the encrypted data element.

In another embodiment, the disclosure includes a system that includes a mix router configured to receive an encryption key request identifying a first encryption key index for an encrypted data element from a network node. The mix router is further configured to identify an encryption service device linked with the encrypted data element in response to receiving the read request and send the encryption key request to the encryption service device. The mix router is further configured to send an encryption key for the encrypted data element to the network node in response to receiving the encrypted key. The system further includes the encryption service device in signal communication with the mixer router. The encryption service device includes a memory configured to store a plurality of encryption keys and an encrypted data entry. Each encryption key is linked with an encryption key index. The encrypted data entry comprises the encrypted data element and metadata linked with the encrypted data element. The metadata identifies the first encryption key index referencing a first encryption key from the plurality of encryption keys and an encryption wait time period. The encryption service device further includes an encryption service engine configured to periodically re-encrypt the encrypted data element. The encryption service engine is further configured to receive the encryption key request, obtain the first encryption key from the memory using the first encryption key index in response to receiving the encryption key request, and send the first encryption key to the mix router in response to obtaining the first encryption key from the memory. The encryption service engine is configured to limit the bandwidth of a data channel used to send the first encryption key.

In yet another embodiment, the disclosure includes a method that includes periodically re-encrypting an encrypted data element. Re-encrypting the encrypted data element includes accessing an encrypted data entry in a memory. The encrypted data entry comprises an encrypted data element and metadata linked with the encrypted data element. The metadata identifies a first encryption key index referencing a first encryption key from the plurality of encryption keys and an encryption wait time period. The process further includes determining the encryption wait time period has lapsed, obtaining the first encryption key from the memory using the first encryption key index, and decrypting the encrypted data element using the first encryption key to recover an original data element. The process further includes obtaining a second encryption key, encrypting the original data element using the second encryption key, and modifying the metadata linked with the encrypted data element with a second encryption key index referencing the second encryption key. The method further includes receiving a data request for the encrypted data element, sending the encrypted data element in response to receiving the data request, and limiting the bandwidth of a data channel used to send the encrypted data element.

Disclosed herein are various embodiments of a system that provides several technical advantages. For example, by periodically re-encrypting stored data with different encryption keys, the encryption service device provides enhances data security. In the event of a data breach, the encryption key is only valid for a decrypting data for a period of time before the data is re-encrypted using a different encryption key. The encryption service device also limits the amount of data that can be downloaded by other device such that only a small portion of the encrypted data can be accessed or downloaded within a period of time. The encryption service device provides a technical advantage by combining periodic data re-encryption with data exportation control to limit the amount of data that can be exfiltrated and accessed. This combination limits bot the amount of data a bad actor has access to as well as their ability to access the contents of the encrypted data.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Computers and other network devices are increasingly interconnected over private and public networks (e.g. cloud networks), which exposes them to an increased risk of attack. In the event of data breach, an unauthorized user (e.g. a bad actor) may steal sensitive information from the computer network. For example, passwords, personal information, medical information, and/or financial information may become compromised when a bad actor is able to breach a computer network.

Conventional systems may encrypt stored data in an effort to make it harder for a bad actor to read stolen (also referred to as exfiltrated) data. Encrypting the stored data provides some level of protection, however bad actors are still able to obtain large amounts of data. Bad actors may also obtain an encryption key for the data using data exfiltration. Once data leaves the network, the network is unable to protect the data. This means that once data has been exfiltrated, bad actors can use more time intensive processes (e.g. brute force) to decrypt the data. Existing networks are unable to protect their data and to mitigate damage caused by events like data breaches.

Disclosed herein are various embodiments of a system that combines periodic data re-encryption with data exportation control to limit the amount of data that can be exfiltrated and accessed by a bad actor. In one embodiment, a communication system is generally configured to constantly re-encrypt data that is stored in a memory. The system uses a new encryption key each time the data is re-encrypted. The constantly changing encryption key makes it difficult for bad actors to decrypt any exfiltrated data because the encryption key may have already changed before the data can be decrypted. The system is also configured to control and limit the amount of data that can leave the memory within a period of time. By controlling and limiting the amount of data, the system ensures that only a small amount of data will leave the system in the event of a data breach. This means that a bad actor will be unable to extract large amount of data at any given time. This combination provides a technical advantage over conventional systems by both limiting the amount of data a bad actor has access to and limiting their ability to access the contents of the encrypted data.

Figure 1:
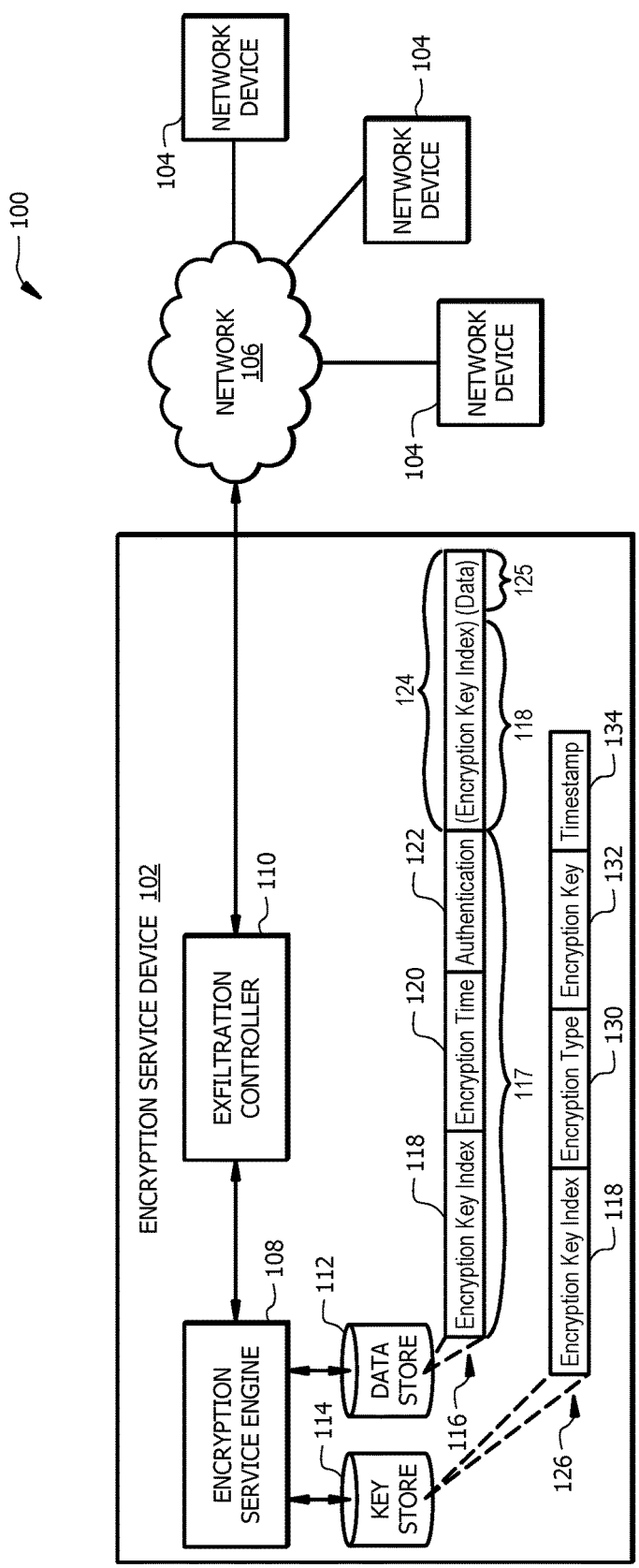
FIG. 1 is a schematic diagram of an embodiment of a communication system.

FIG. 1 is a schematic diagram of an embodiment of a communication system 100 comprising an encryption service device 102 in signal communication with one or more network devices 104 via a network 106. The encryption service device 102 and the network devices 104 may be members of the same network or members of different networks. The encryption service device 102 is configured to employ any suitable type of connection to communicate with the network devices 104. FIG. 1 shows a single encryption service device 102 and three network devices 104. In other examples, the communication system 100 may comprise any suitable number of encryption service devices 102 and network devices 104.

The encryption service device 102 is generally configured to provide encryption key management, to periodically re-encrypt data stored in a memory, and to provide data exportation control. Additional information for the encryption service device 102 is described in FIG. 2. In one embodiment, the encryption service device 102 comprises an encryption service engine 108, an exfiltration controller 110, a key store 114, and a data store 112. The encryption service engine 108 is generally configured to encrypt stored data and periodically re-encrypt the stored data using rolling encryption keys. By periodically re-encrypting the stored data, the encryption service engine 108 provides enhanced information security. For example, in the event that a bad actor is able to obtain an encryption key, the encryption key is only valid for decrypting data for a period of time before the data is re-encrypted using a different encryption key. The encryption key obtained by the bad actor is no longer valid once the data has been re-encrypted and the bad actor is no longer able to decrypt the data.

In one embodiment, the encryption service engine 108 is configured to use the exfiltration controller 110 to limit the bandwidth of encrypted data that is sent from the encrypted service device 102 to other network devices 104 in the communication with system 100 over a period of time. The encryption service engine 108 controls how much data can be exfiltrated by limiting the bandwidth of the data channel (e.g. port) used to provide data. By limiting the bandwidth of the data channel, the encryption service engine 108 prevents a bad actor from being able to access or download large quantities of data. The encryption service engine 108 limits the bandwidth such that only a small portion of the encrypted data can be accessed or downloaded within a period of time.

In another embodiment, the encryption service engine 108 is configured to use the exfiltration controller 110 to limit the amount of encrypted data that is sent from the encrypted service engine 108 to other network devices 104 in the communication system 100. The encryption service engine 108 controls how much data can be exfiltrated by limiting the amount, for example, in terms of bytes, of data that can be downloaded by a device and/or within a period of time. For example, the encryption service engine 108 may be configured to only allow a device to download 10 megabytes of data per hour. In other examples, the encryption service engine 108 may be configured to use any other data limit threshold and/or time intervals. The encryption service engine 108 limits the volume of data that is downloaded by other devices such that only a small portion of the encrypted data can be accessed or downloaded within a period of time.

The combination of periodically re-encrypting the stored data and limiting the amount of data that can be exfiltrated means that a bad actor only has access to a small amount of data that is encrypted using an encryption key that constantly changes. This combination provides a technical advantage over conventional systems by both limiting the amount of data a bad actor has access to as well as limiting their ability to access the contents of the encrypted data. An example of the encryption service engine 108 in operation is described in FIG. 3.

The data store 112 is generally configured to store encrypted data. In one embodiment, the data store 112 is a dedicated memory device used for storing encrypted data. In another embodiment, the data store 112 is an allocated portion of memory within a memory device. The memory device may comprise one or more other portions of memory dedicated to other types of data.

In one embodiment, the data store 112 is a data structure (e.g. a table) comprising a plurality of encrypted data entries 116. The encrypted data entries 116 may be configured as a plurality of rows or columns in the data store 112. Each encrypted data entry 116 comprises an encrypted data element 124 linked and metadata 117 linked with the encrypted data element 124. In one embodiment, the metadata 117 comprises an encryption key index 118, an encryption time 120, and an authentication token 122. The encryption key index 118 identifies or reference the encryption key that was used to encrypt the encrypted data element 124. The encryption time 120 indicates an encryption wait time period. The encryption wait time period indicates how often or when the encrypted data element 124 should be re-encrypted using another encryption key. The authentication token 122 may be used to authenticate the encrypted data element 124. For example, the authentication token 122 may be a hashing of the encryption key index 118, the encryption time 120, and at least a portion of the encrypted data element 124. In other examples, the authentication token 122 may use any other suitable value or technique to authenticate an encrypted data element 124.

In one embodiment, the encrypted data element 124 comprises the encryption key index 118 and a data element 125. Examples of the data element 125 include, but are not limited to, electronic documents, text files, images, video files, music files, and any other suitable type of document or file. The encrypted data element 124 is encrypted using the encryption key identified by the encryption key index 118. In other embodiments, the encrypted data element 124 comprises the data element 125 and/or any other suitable information.

The key store 114 is generally configured to store and manage encryption keys. In one embodiment, the key store 114 is a data structure (e.g. a table) that comprises a plurality of entries 126 referencing different encryption keys. As an example, an entry 126 in the key store 114 may comprise an encryption key index 118, an encryption type 130, an encryption key 132, and a timestamp 134. The encryption key index 118 identifies an encryption key index linked with an encryption key 132. The encryption type 130 identifies the type of encryption for the encryption key 132. For example, the encryption type 130 may indicate Advanced Encryption Standard (AES) 256 as an encryption type. The encryption key 130 is the encryption key that is used to encrypt a data element 125. The timestamp 134 indicates when the encryption key 132 was used to encrypt the data element 125. In other examples, an entry 126 in the key store 114 may comprise any other suitable information or combination of information.

In FIG. 1, the data store 112 and the key store 114 are shown as integrated with the encryption service device 102. In other embodiments, the data store 112 and/or the key store 114 may be external to the encryption service device 102. For example, the data store 112 and/or the key store 114 may be stored in another device that is in signal communication with the encryption service device 102.

The network devices 104 are configured to communication data with the encryption service device 102 and/or one or more other network devices 104. Examples of network devices 104 include, but are not limited to, web clients, web servers, user devices, mobile phones, computers, tablet computers, and laptop computers. For example, a network device 104 may communicate with the encryption service device 102 in order access (e.g. download) data and/or an encryption key from the encrypted service device 102.

The network 106 comprises a plurality of network nodes configured to communicate data between the encryption service device 102 and the network devices 104. Examples of network nodes include, but are not limited to, routers, switches, modems, web clients, and web servers. The network 106 is any suitable type of wireless and/or wired network including, but not limited to, all or a portion of the Internet, a peer-to-peer network, a public network, a private network, the public switched telephone network, a cellular network, and a satellite network. The network 106 is configured to support any suitable communication protocols as would be appreciated by one of ordinary skill in the art upon viewing this disclosure. In one embodiment, the encryption service device 102 is located in a private or secure portion of the network 106.

Figure 2:
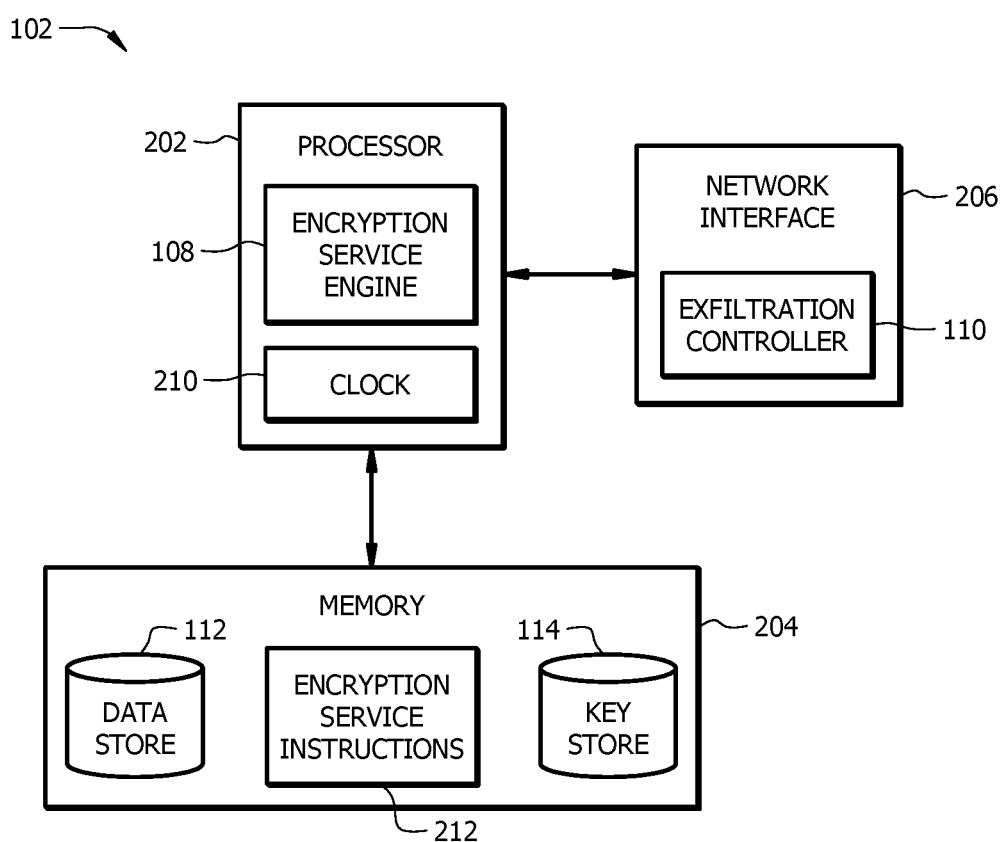
FIG. 2 is a schematic diagram of an embodiment of an encryption service device.

FIG. 2 is a schematic diagram of an embodiment of an encryption service device 102. The encryption service device 102 comprises a processor 202, a memory 204, and a network interface 206. The encryption service device 102 may be configured as shown or in any other suitable configuration.

The processor 202 comprises one or more processors operably coupled to the memory 204. The processor 202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The processor 202 is communicatively coupled to and in signal communication with the memory 204. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement an encryption service engine 108. In an embodiment, the encryption service engine 108 is implemented using logic units, FPGAs, ASICs, DSPs, or any other suitable hardware. The encryption service engine 108 is generally configured to provide encryption key management, to periodically re-encrypt data stored in a memory, and to provide data exportation control similar to the encryption service engine 108 described in FIG. 1. An example of the encryption service engine 108 in operation is described in FIG. 3. In one embodiment, the encryption service engine 108 is configured to use different encryption keys to encrypt and re-encrypt different segments or partitions of a memory (e.g. a data store 112). An example of the encryption service engine 108 encrypting and re-encrypting different segments or partitions of a memory is shown in FIG. 4.

An example algorithm for the encryption service engine 108 is as follows: determine that an encryption wait time period has lapsed; obtain a first encryption key from a plurality of encryption keys using a first encryption key index; decrypt an encrypted data element using the first encryption key to recover the original data element; obtain a second encryption key; encrypt the original data element using the second encryption key; modify the metadata linked with the encrypted data element with a second encryption key index referencing the second encryption key; receive a data request for the encrypted data element; send the encrypted data element in response to receiving the data request; and limit the bandwidth of a data channel used to send the encrypted data element.

In one embodiment, the processor 202 comprises a clock or timer 210. For example, the clock 210 may be implemented using a count register with a clock signal. In other embodiments, the processor 202 is operably coupled to an external clock or timer. The clock 210 is configured to indicate a time or relative time. For example, the clock 210 may be used as a reference when determining if a data element should be re-encrypted.

The memory 204 comprises one or more disks, tape drives, or solid-state drives, and may be used as an over-flow data storage device, to store programs when such programs are selected for execution, and to store instructions and data that are read during program execution. The memory 204 may be volatile or non-volatile and may comprise read-only memory (ROM), random-access memory (RAM), ternary content-addressable memory (TCAM), dynamic random-access memory (DRAM), and static random-access memory (SRAM). The memory 204 is operable to store encryption service instructions 212, a data store 112, a key store 114, and/or any other data or instructions. The encryption service instructions 212 comprise any suitable set of instructions, logic, rules, or code operable to execute the encryption service engine 108. The data store 112 and the key store 114 is configured similar to the data store 112 and the key store 114 described in FIG. 1.

The network interface 206 is configured to enable wired and/or wireless communications. The network interface 206 is configured to communicate data through the communication network 100 and/or any other system or domain. For example, the network interface 206 may be configured for communication with a modem, a switch, a router, a bridge, a server, or a client. The processor 202 is configured to send and receive data using the network interface 206 from the communication network 100.

In one embodiment, the network interface 206 is configured to implement an exfiltration controller 110 that limits the bandwidth of data channels used to communicate encrypted data to other devices. In another embodiment, the network interface 206 is configured to implement an exfiltration controller 110 that controls how much data can be exfiltrated by limiting the amount of data that can be downloaded by a device and/or within a period of time. In one embodiment, the exfiltration controller 110 may be implemented as a set of rules or policies that are applied to one or more ports to control the data flow through the ports. In other examples, the exfiltration controller 110 may be implemented using any suitable technique as would be appreciated by one of ordinary skill in the art.

Figure 3:
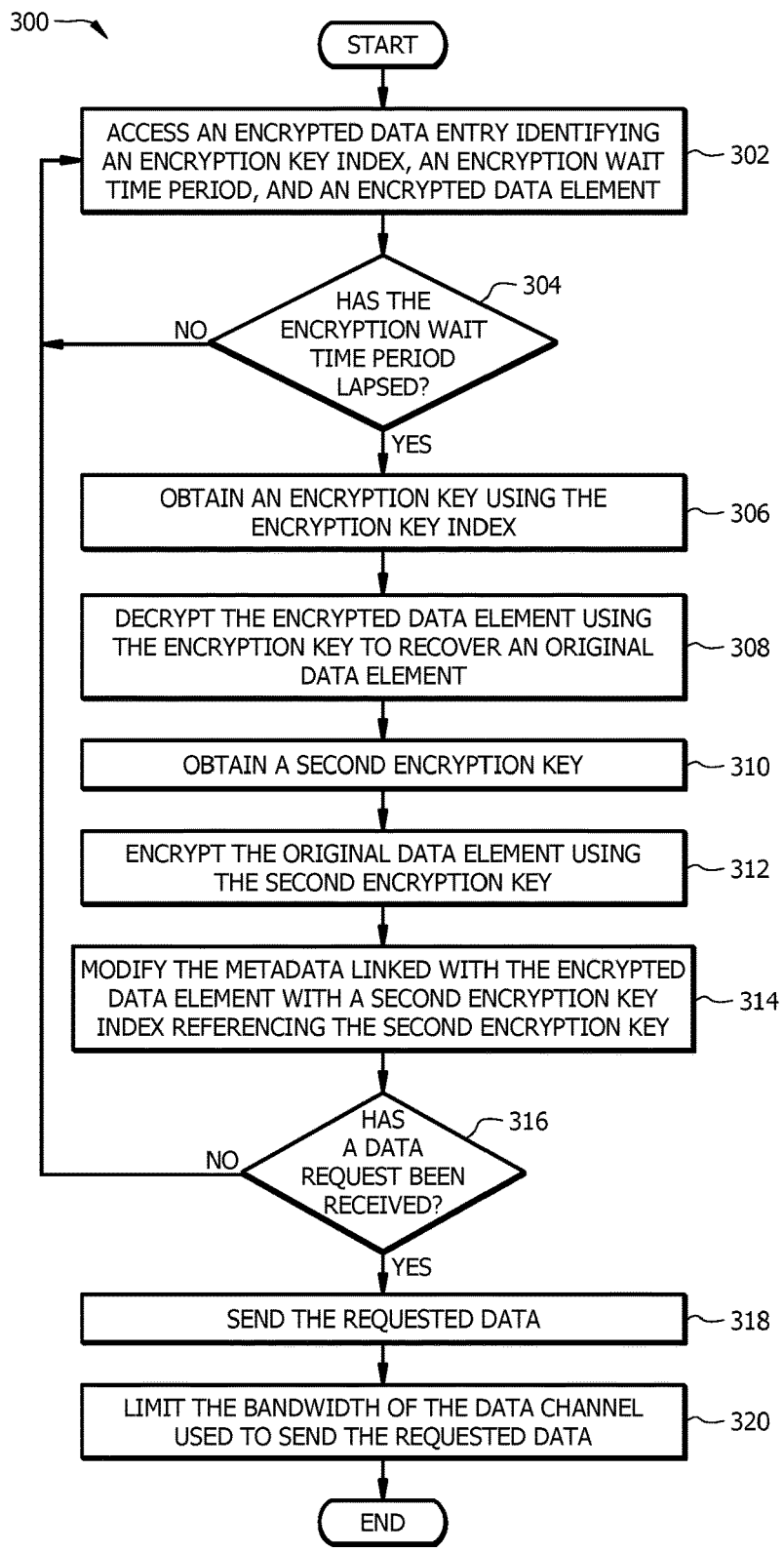
FIG. 3 is a flowchart of an embodiment of an encryption service method for the encryption service device.
Figure 4:
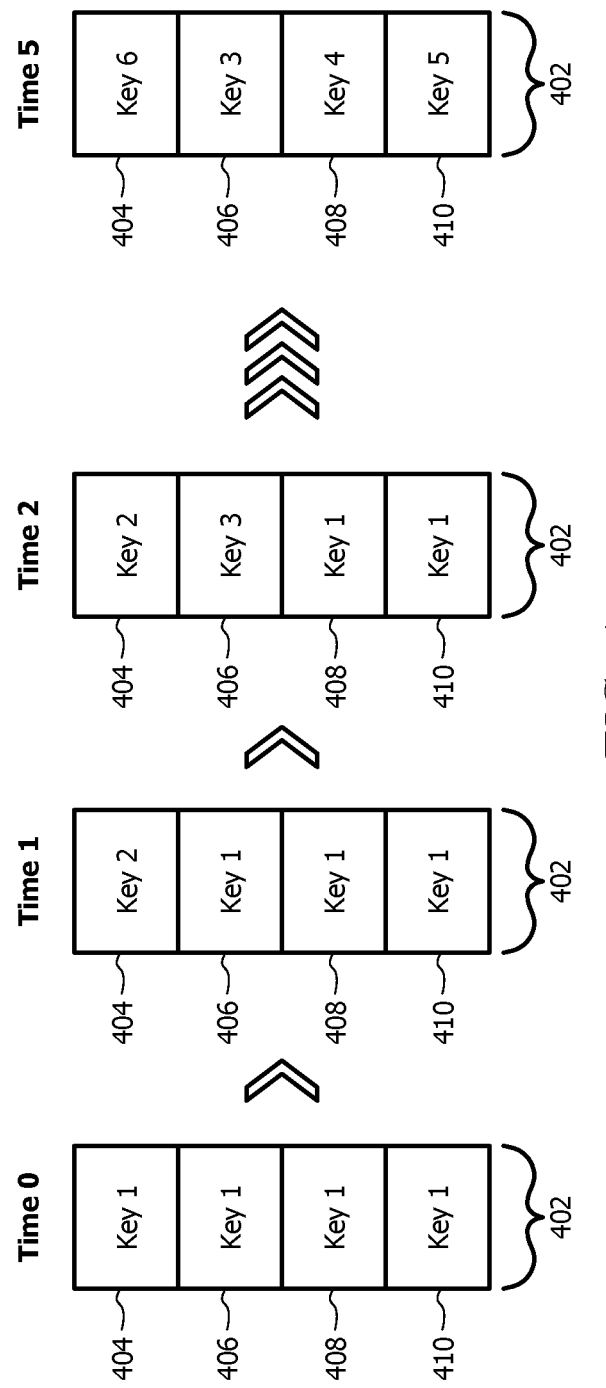
FIG. 4 is a timing diagram of memory with encrypted data partitions.

FIG. 3 is a flowchart of an embodiment of an encryption service method 300 for the encryption service device 102. Method 200 is implemented by the encryption service engine 108 to re-encrypt data stored in a memory and to facilitate sending encrypted data to another device (e.g. network device 104). A non-limiting example is provided to illustrate how the encryption service engine 108 implements method 200 to encrypt and send data.

The encryption service engine 108 may be configured to iteratively cycle though entries 116 and/or data partitions in the data store 112. At step 302, the encryption service engine 108 accesses an encrypted data entry 116 in a data store 112. The encrypted data entry 116 identifies an encryption key index 118, an encryption wait time period (e.g. encryption time 120), and an encrypted data element 124.

At step 304, the encryption service engine 108 determines whether the encryption wait time period has lapsed. For example, the encryption service engine 108 uses the clock 210 to determine whether the encryption wait time period has lapsed. When the encryption wait time period has lapsed, the encrypted data entry 116 is due to be re-encrypted with a new encryption key 132. The encryption service engine 108 proceeds to step 306 when the encryption service engine 108 determines that the encryption wait time period has lapsed. Otherwise, the encryption service engine 108 returns to step 302 when the encryption wait time period has not already lapsed. The encryption service engine 108 returns to step 302 to check if any other encrypted data entry 116 are due to be re-encrypted with a new encryption key 132.

At step 306, the encryption service engine 108 obtains an encryption key 132 using the encryption key index 118. For example, the encryption service engine 108 uses the encryption key index 118 as an identifier to look-up an entry 126 for an encryption key 132 in the key store 114 corresponding with the encryption key index 118. The entry 126 identifies the encryption key 132 that was used to encrypt the encrypted data element 124. At step 308, the encryption service engine 108 decrypts the encrypted data element 124 using the encryption key 132 to recover the original data element 125.

At step 310, the encryption service engine 108 obtains a second encryption key 132 from the key store 114. In one embodiment, the encryption service engine 108 identifies another entry 126 in the key store 114 that identifies the second encryption key 132 for re-encrypting the data element 125 and a second encryption key index 118 linked with the second encryption key 132.

In another embodiment, the encryption service engine 108 generates the second encryption key 132 and the second encryption key index 118. The encryption service engine 108 may generate the second encryption key 132 using any suitable technique. In this example, the encryption service engine 108 creates a new record (i.e. entry 126) in the key store 114 identifying the second encryption key 132 and the second encryption key index 118. At step 312, the encryption service engine 108 encrypts the original data element 125 using the second encryption key 132.

At step 314, the encryption service engine 108 modifies the metadata 117 in the entry 116 linked with the encrypted data element 124 with the second encryption key index 118 that references the second encryption key 132. For example, the encryption service engine 108 overwrites the information associated with the previous encryption key with information associated with the second encryption key 132. The encryption service engine 108 may also modify and update the authentication token 122 based on the second encryption key 132 and the second encryption key index 118.

At step 316, the encryption service engine 108 determines whether a data request has been received. The encryption service engine 108 may receive a request for encrypted data from the data store 112 and/or encryption key information from the key store 114 from a network device 104. For example, the encryption service engine 108 may receive a data request for an encrypted data entry 116 and/or an encrypted data element 124 in the data store 112. As another example, the encryption service engine 108 may receive a data request for an encryption key 132. The data request may identify an encryption key index 118 that is linked with the encryption key 132. The encryption service engine 108 proceeds to step 318 when the encryption service engine 108 determines that a data request has been received. Otherwise, the encryption service engine 108 returns to step 302 to continue the periodic re-encryption process.

At step 318, the encryption service engine 108 sends the requested data. At step 320, the encryption service engine 108 limits the bandwidth of the data channel used to send the requested data. In one embodiment, the encryption service engine 108 returns to step 302 to re-encrypt an encrypted data element in response to sending the encrypted data element. In other words, the encryption service engine 108 re-encrypts any encrypted data once it leaves the data store 112.

In one embodiment, the encryption service engine 108 returns to step 302 to check if any other encrypted data entry 116 are due to be re-encrypted with a new encryption key 132.

FIG. 4 is a timing diagram of encrypted data partitions in a memory 402 (e.g. memory 204 or data store 112). In one embodiment, the encryption service engine 108 is configured to encrypt groups of data within a data segment or partition using a common encryption key 132. The data segment or partition is a subset of a memory space. In FIG. 4, the memory 402 has four encrypted data partitions shown as encrypted data partitions 404, 406, 408, and 410. In other examples, the memory may comprise any other suitable number of encrypted data partitions.

In one embodiment, each encrypted data partitions 404, 406, 408, and 410 is linked with an entry 116 that identifies an encryption time 120 for each encrypted data partitions 404, 406, 408, and 410. At time zero, all four encrypted data partitions 404, 406, 408, and 410 are encrypted with the same encryption key 132 (e.g. a first encryption key 132). At time one, the first encrypted data partition 404 is re-encrypted using a second encryption key 132. The other encrypted data partitions 406, 408, and 410 are not re-encrypted with the second encryption key 132. At time two, the second encrypted data partition 406 is re-encrypted using a third encryption key 132. The other encrypted data partitions 404, 408, and 410 are not re-encrypted with the third encryption key 132. The process of sequentially re-encrypting the encrypted data partitions 404, 406, 408, and 410 may be repeated starting at the first encrypted data partition 404 once all of the encrypted data partitions 404, 406, 408, and 410 have been re-encrypted. For example, at time five, the first encrypted data partition 404 is re-encrypted using a sixth encryption key 132, which begins the re-encrypting cycle again.

In one embodiment, the encryption service engine 108 is configured to ensure that once an encryption key 132 has been used for a encrypted data partition that it is not used again for the same encrypted data partition. In one embodiment, the encryption service engine 108 discards the previous encryption key 132 from the key store 114 once an encrypted data partition has been encrypted using another encryption key 132. This process may ensure that encryption keys 132 are not used again by any encrypted data partitions.

In one embodiment, the memory 402 is configured such that each encrypted data partition uses a different encryption key. For example, each encrypted data partitions 404, 406, 408, and 410 may be initially encrypted using a different encryption key, which may be periodically changes using a process similar to the process previously described.

In other embodiments, the encryption service engine 108 is configured to re-encrypt the encrypted data partitions 404, 406, 408, and 410 in any other order. For example, the encryption service engine 108 may randomly select encrypted data partitions 404, 406, 408, and 410 to re-encrypt.

Figure 5:
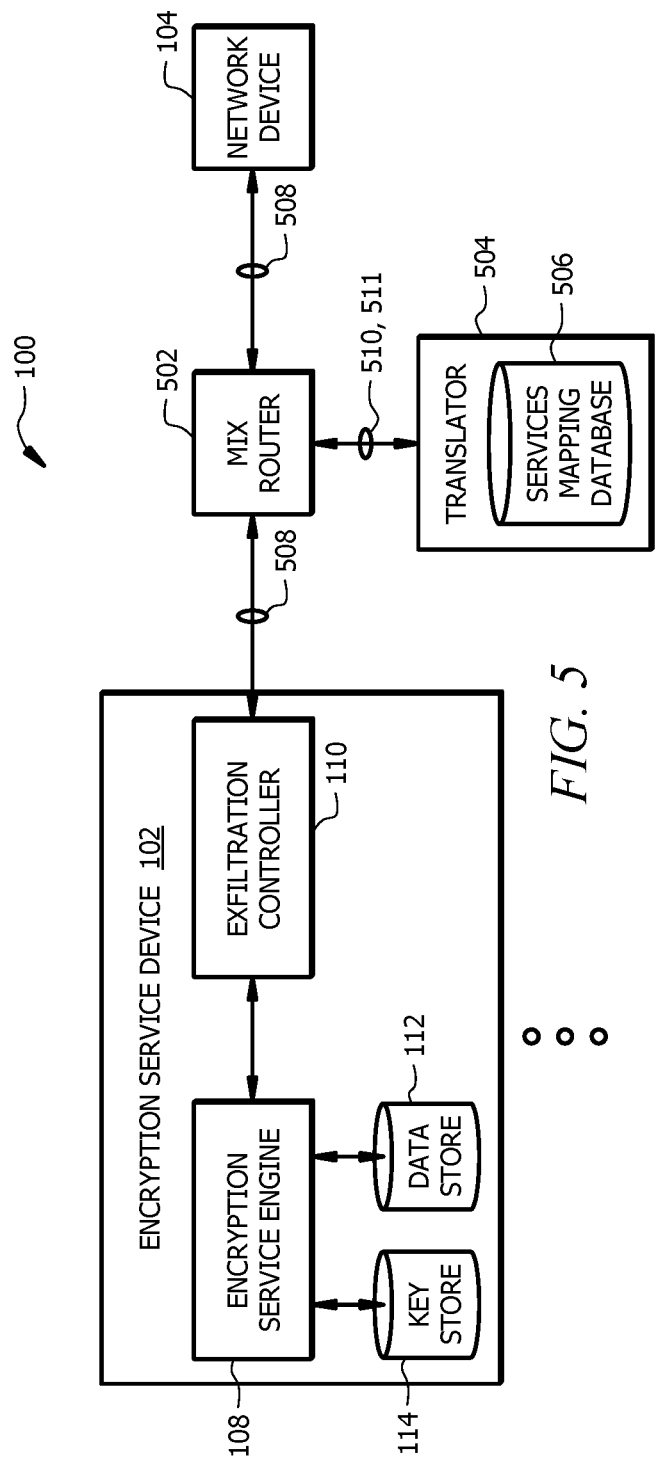
FIG. 5 is a schematic diagram of another embodiment of a communication system using a mix router.

FIG. 5 is a schematic diagram of another embodiment of a communication system 100 using a mix router 502. The encryption service device 102 and the network device 104 may be configured similar to the encryption service device 102 and the network devices 104 described in FIG. 1. For simplicity, FIG. 5 shows a single encryption service device 102. The communication system 100 may comprise any suitable number of encryption service devices 102.

The mix router 502 is in signal communication with one or more network nodes 104 and the encryption service device 102. The mix router 502 is generally configured to facilitate communicating data between a network node 104 and the encryption service device 102. In one embodiment, the mix router 502 is a mix router configured to implement a routing protocol that receives messages from multiple senders, shuffles the messages, and sends them messages back out in a random order to the next destination. In this configuration, the mix router 502 breaks the link between the source of a request and the destination, which make it harder for bad actors to trace end-to-end communications. In another embodiment, the mix router 502 is an onion router configured to encapsulate messages within layers of encryption. As an encrypted message is transmitted through a series of network nodes, each network node removes (i.e. decrypts) an encryption layer to determine the next destination for the message. In this configuration, the sender and destination remain anonymous because each intermediary network node only knows the location of the immediately preceding and following network nodes. In other embodiments, the mix router 502 may be any other suitable type of router.

The mix router 502 may be configured to receive an encryption key request 508 identifying an encryption key index 118 for an encrypted data element 124. The mix router 502 is configured to identify the encryption service device 108 that is linked with the encrypted data element. In one embodiment, the mix router 502 may comprise a look-up table that links encryption service devices 102 with encryption key indexes 118 and encryption keys 132. For example, the mix router 502 may use the encryption key index 118 to identify the encryption service device 102 that is storing the encryption key 132 linked with the encryption key index 118.

In another embodiment, the mix router 502 uses a translator device 504 to identify the encryption service device 102 that is storing the encryption key 132 linked with the encryption key index 118. For example, the mix router 502 send a device identification request 510 comprising the encryption key index 118 to the translator device 504. The mix router 502 receives information 511 identifying the encryption service device 102 in response to sending the device identification request 511. In one embodiment, the information 511 identifying the encryption service device 102 may be obfuscated or masked by the translator device 504. The mix router 502 is configured to deobfuscate the information 511 to determine the encryption service device 102 that is storing the encryption key 132 linked with the encryption key index 118. The mix router 502 and the translator device 504 are configured to use any suitable technique for obfuscating or masking messages as would be appreciated by one of ordinary skill in the art.

The mix router 502 is further configured to send the encryption key request 508 to the encryption service device 102 in response to determining that the encryption service device 102 is storing or has access to the encryption key 132 linked with the encryption key index 118. The encryption service device 102 uses to the encryption service index 118 to identify the requested encryption key 132 and sends the encryption key 132 to the mix router 502. The mix router 502 then sends the encryption key 132 to the network node 104 in response to receiving the encryption key 132.

In one embodiment, the mix router 502 is configured to direct suspicious messages to a network honeypot. For example, the mix router 502 may direct incoming messages or request with known compromised source and/or destination addresses to a network honeypot for monitoring. The network honeypot may be configured to allow a network operator to learn information about a bad actor. For example, the network honeypot may comprise data with unique identifying properties that can help an analyst track stolen data and identify connection between different participants in an attack. In other examples, any other suitable type of network honeypot may be employed as would be appreciated by one of ordinary skill in the art upon viewing this disclosure.

An example algorithm for the mix router 502 is as follows: receive an encryption key request identifying a first encryption key index for an encrypted data element from a network node; identify an encryption service device linked with the encrypted data element in response to receiving the encryption key request; send the encryption key request to the encryption service device; receive an encryption key for the encrypted data element from the encryption service device in response to sending the encryption key request; and send the encryption key to the network node in response to receiving the encrypted key.

In one embodiment, the translator device 504 is a network device in signal communication with the mix router 502. In another embodiment, the translator device 504 is integrated with the mix router 502. The translator device 504 comprises a memory configured to store a services mapping database 506. The services mapping database 506 is a data structure (e.g. a table) that comprises a plurality of entries that each link encryption key indexes 118 with encryption service devices 102. In one embodiment, the translator device 504 is configured to receive a device identification request 510 comprising an encryption key index 118. The translator device 504 is configured to use to the encryption service index 118 to identify the encryption service device 102 linked with the encryption service index 118 and to send information 511 identifying the encryption service device 102 to the mix router 502 in response to identifying the encryption service device 102.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus comprising: a memory configured to store: a plurality of encryption keys, wherein each encryption key is linked with an encryption key index; and an encrypted data entry, wherein the encrypted data entry comprises an encrypted data element and metadata linked with the encrypted data element, wherein the metadata identifies: a first encryption key index referencing a first encryption key from the plurality of encryption keys, and an encryption wait time period; and an encryption service engine configured to: periodically re-encrypt the encrypted data element stored in the memory, wherein re-encrypting the encrypted data element comprises: determining that the encryption wait time period has lapsed; obtaining the first encryption key from the plurality of encryption keys using the first encryption key index; obtaining the encrypted data element from the memory; decrypting the encrypted data element using the first encryption key to recover an original data element; obtaining a second encryption key; encrypting the original data element using the second encryption key; and modifying the metadata linked with the encrypted data element with a second encryption key index referencing the second encryption key; receive a data request for the encrypted data element; send the re-encrypted data element in response to receiving the data request; limit a bandwidth of a data channel used to send the re-encrypted data element; and wherein the metadata comprises an authentication token generated based on a current encryption key index, the encryption wait time period, and at least a portion of the encrypted data element.

2. The apparatus of claim 1, wherein obtaining the second encryption key comprises receiving the second encryption key from the memory.

3. The apparatus of claim 1, wherein the encryption service engine is configured to remove the first encryption key from the memory in response to decrypting the encrypted data element using the first encryption key.

4. The apparatus of claim 1, wherein: the memory comprises a plurality of data partitions, and each of the plurality of data partitions uses a different encryption key to encrypt data entries within each data partition.

5. The apparatus of claim 1, wherein obtaining the second encryption key comprises: generating the second encryption key, and creating a record in the memory for the second encryption key, wherein the record identifies: the second encryption key, the second encryption key index, and an encryption timestamp.

6. The apparatus of claim 1, wherein the encryption service engine is configured to: receive an encryption key request identifying the first encryption key index; obtain the first encryption key from the plurality of encryption keys using the first encryption key index; and send the first encryption key in response to the receiving the encryption key request, wherein sending the first encrypted key comprises limiting the bandwidth of a data channel used to send the first encryption key.

7. A system comprising: a mix router configured to: receive an encryption key request identifying a first encryption key index for an encrypted data element from a network node; identify an encryption service device linked with the encrypted data element in response to receiving the encryption key request; send the encryption key request to the encryption service device; obtain an encryption key for the encrypted data; and send the encryption key for the encrypted data element to the network node in response to receiving the encrypted key; and the encryption service device in signal communication with the mixer router, comprising: a memory configured to store: a plurality of encryption keys, wherein each encryption key is linked with an encryption key index; an encrypted data entry, wherein the encrypted data entry comprises the encrypted data element and metadata linked with the encrypted data element, wherein the metadata identifies: the first encryption key index referencing a first encryption key from the plurality of encryption keys, and an encryption wait time period; and an encryption service engine configured to: periodically re-encrypt the encrypted data element stored in the memory; receive the encryption key request; obtain the first encryption key from the memory using the first encryption key index in response to receiving the encryption key request; send the first encryption key to the mix router in response to obtaining the first encryption key from the memory; limit a bandwidth of a data channel used to send the first encryption key; and wherein the metadata comprises an authentication token generated based on a current encryption key index, the encryption wait time period, and at least a portion of the encrypted data element.

8. The system of claim 7, wherein, in response to sending the first encryption key to the mix router, the encryption service engine is configured to: decrypt the encrypted data element using the first encryption key to recover an original data element; obtain a second encryption key from the plurality of encryption keys; encrypt the original data element using the second encryption key; modify the metadata linked with the encrypted data element with a second encryption key index referencing the second encryption key; and remove the first encryption key from the memory.

9. The system of claim 7, wherein the encryption service engine is configured to: receive a data request for the encrypted data element; and send the encrypted data element in response to receiving the data request, wherein sending the encrypted data element comprises limiting the bandwidth of a data channel used to send the encrypted data element.

10. The system of claim 7, wherein re-encrypting the encrypted data comprises: determining the encryption wait time period has lapsed; obtaining the first encryption key from the memory using the encryption key index; decrypting the encrypted data element using the first encryption key to recover an original data element; obtaining a second encryption key from the plurality of encryption keys; encrypting the original data element using the second encryption key; and modifying the metadata linked with the encrypted data element with a second encryption key index referencing the second encryption key.

11. The system of claim 7, wherein: the encryption key request is encoded using successive layers of encryption, and each layer of encryption is decrypted by a different network device as the encryption key request is forwarded from the network node to the encryption services device.

12. The system of claim 7, further comprising a translator device comprising a second memory, wherein the second memory comprises an entry linking the first key index with the encryption service device; wherein identifying the encryption service device linked with the encrypted data element comprises: sending a device identification request comprising the first encryption key index to the translator device, and receiving information identifying the encryption service device in response to sending the device identification request.

13. A method comprising: periodically re-encrypting, by an encryption service engine stored in a memory, an encrypted data element comprising: accessing an encrypted data entry in the memory, wherein the encrypted data entry comprises an encrypted data element and metadata linked with the encrypted data element, wherein the metadata identifies: a first encryption key index referencing a first encryption key from a plurality of encryption keys, and an encryption wait time period; determining the encryption wait time period has lapsed; obtaining the first encryption key from the memory using the first encryption key index; decrypting the encrypted data element using the first encryption key to recover an original data element; obtaining a second encryption key; encrypting the original data element using the second encryption key; and modifying the metadata linked with the encrypted data element with a second encryption key index referencing the second encryption key; receiving, at the encryption service engine, a data request for the encrypted data element; sending, by the encryption service engine, the encrypted data element in response to receiving the data request; limiting, by the encryption service engine, a bandwidth of a data channel used to send the encrypted data element; and wherein the metadata comprises an authentication token generated based on a current encryption key index, the encryption wait time period, and at least a portion of the encrypted data element.

14. The method of claim 13, wherein obtaining the second encryption key comprises receiving the second encryption key from the memory.

15. The method of claim 13, further comprising removing, by the encryption service engine, the first encryption key from the memory in response to decrypting the encrypted data element using the first encryption key.

16. The method of claim 13, wherein obtaining the second encryption key comprises: generating the second encryption key, and creating a record in the memory for the second encryption key, wherein the record identifies: the second encryption key, the second encryption key index, and an encryption timestamp.

17. The method of claim 13, further comprising: receiving, at the encryption service engine, an encryption key request identifying the first encryption key index; obtaining, by the encryption service engine, the first encryption key from the plurality of encryption keys using the first encryption key index; and sending, by the encryption service engine, the first encrypted key in response to the receiving the encryption key request, wherein sending the first encrypted key comprises limiting the bandwidth of a data channel used to send the first encrypted key.

* * * * *